United States Patent

Nagano

[11] Patent Number: 6,101,218
[45] Date of Patent: Aug. 8, 2000

[54] LEAKAGE POWER MEASUREMENT APPARATUS AND METHOD

[75] Inventor: Masao Nagano, Fukiage-machi, Japan

[73] Assignee: Advantest Corp., Tokyo, Japan

[21] Appl. No.: 08/898,337

[22] Filed: Jul. 22, 1997

Related U.S. Application Data

[63] Continuation-in-part of application No. 08/495,312, Jun. 27, 1995, abandoned.

[30] Foreign Application Priority Data

Jun. 27, 1994 [JP] Japan .................................... 6-167335

[51] Int. Cl.[7] ............................ H04B 17/00; H04L 23/00
[52] U.S. Cl. .......................... 375/224; 375/377; 455/67.1
[58] Field of Search ..................................... 375/224, 377; 370/241; 455/115, 67.1, 67.3, 226.1

[56] References Cited

U.S. PATENT DOCUMENTS

| | | | |
|---|---|---|---|
| 3,648,176 | 3/1972 | Martin et al. | 455/115 |
| 4,810,960 | 3/1989 | Owen et al. | 455/67.1 |
| 5,303,262 | 4/1994 | Johnson | 375/224 |
| 5,475,709 | 12/1995 | Futagami et al. | 375/224 |
| 5,506,869 | 4/1996 | Royer | 375/224 |
| 5,630,218 | 5/1997 | Muto | 455/67.3 |

FOREIGN PATENT DOCUMENTS 0 854 594  7/1998  European Pat. Off. .......... H04B 7/26

*Primary Examiner*—Stephen Chin
*Assistant Examiner*—Betsy Deppe
*Attorney, Agent, or Firm*—Muramatsu & Associates

[57] ABSTRACT

An apparatus and method for measuring power of carrier channel in question and power leaked from an adjacent channel (leakage power) of a transmitter, and calculating a ratio between the leakage power and the carrier power in the time domain using a digital signal processing technique. The power measurement apparatus includes a frequency mixer which receives a signal from a transmission channel in consideration, an A/D converter for converting an output of the frequency mixer to a digital signal, a Hilbert converter for converting the digital signal into a complex signal, a low pass filter for removing low frequency components from the output signal of the Hilbert converter, a bandpass filter for separating the output of the low pass filter into the carrier power and the leakage power, and a power processing unit for computing the ratio between the leakage power and the carrier power.

5 Claims, 7 Drawing Sheets

Fig.4b (b) Digitalized IF data

Fig.4c (c) Hilbert Convesion

Fig.4d (d) LPF

Fig.4e (e) 1/4 Decimated data

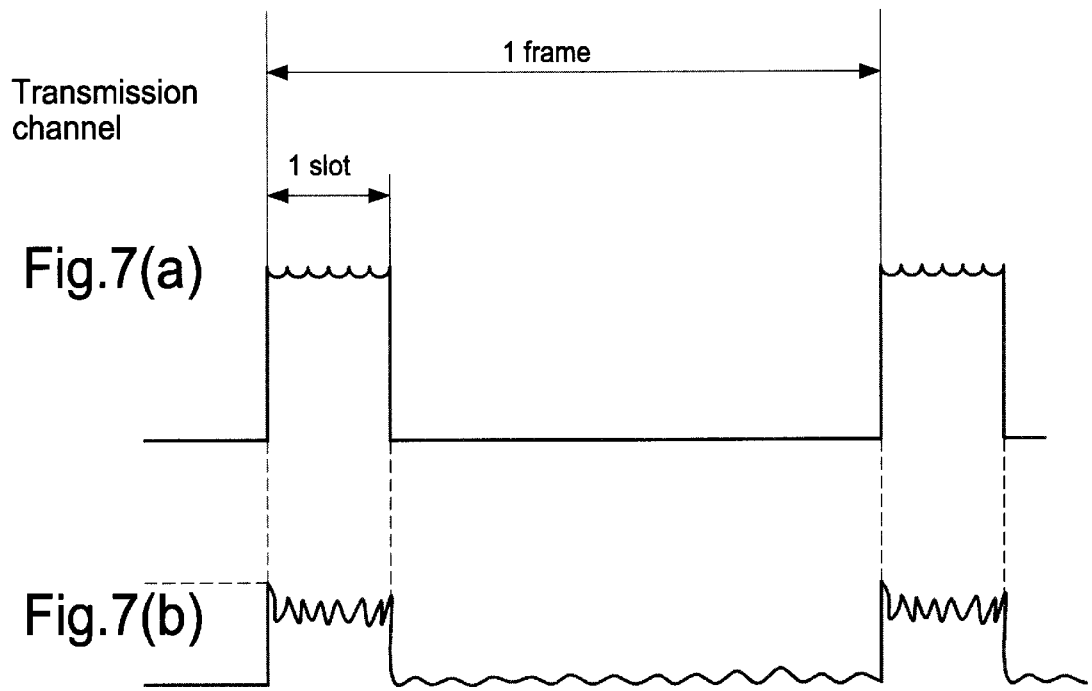
Fig.7(a)
Fig.7(b)
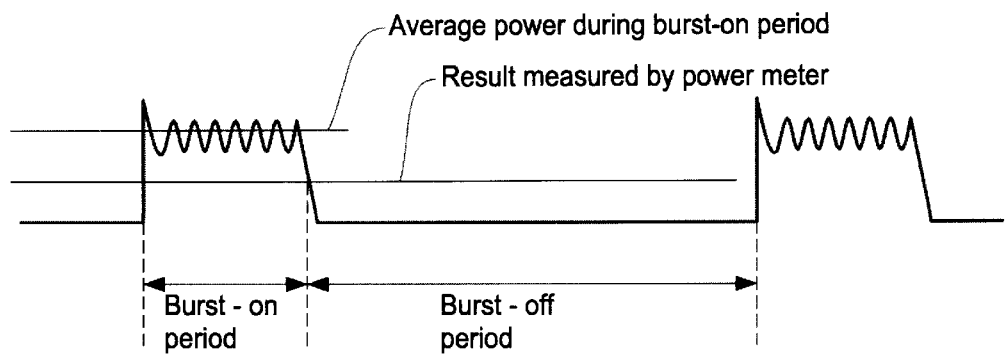
Fig.8 (Prior Art)
Adjacent channel peak power 6,101,218

LEAKAGE POWER MEASUREMENT APPARATUS AND METHOD

This is a continuation-in-part of U.S. patent application Ser. No. 08/495,312 filed Jun. 27, 1995, now abandoned.

FIELD OF THE INVENTION

This invention relates to a leakage-power measurement apparatus and method which facilitates the measurement of power leaked from adjacent channels of communication devices such as a transmitter in the time domain.

BACKGROUND OF THE INVENTION

In a transmitter having a plurality of transmission channels, carrier signal power of other transmission channels, especially of adjacent channels, leak to a transmission channel in question. In such a situation, a ratio between such power leaked from the adjacent channels and the carrier signal power of the channel in question is important for a purpose of evaluating transmission quality. Hereafter, the carrier power of the adjacent channels leaked to the channel in question may also be referred to as "leakage power", and the channel in question may also be referred to as "carrier channel" or "transmission channel."

Traditionally, when measuring leakage power from the adjacent channels of a transmitter, evaluation of signals in the steady state is performed in the frequency domain by, for example, a frequency spectrum analyzer.

FIG. 7 shows an example of waveforms with respect to a transmission (carrier) channel and a channel adjacent to the transmission channel. In a typical transmission channel, information data is transmitted for a constant period of time as a burst (shown in FIG. 7(a)), using a time-sharing transmission method. The burst-on period is typically referred to as a slot, while the repeated sequence of pulses between the bursts is typically referred to as a frame. For example, when an instantaneously changing signal, such as a TDMA (time division multiple access) burst signal is produced in the transmission channel, an interference wave is generally induced in the adjacent channels (i.e., the channels assigned to the neighboring frequency band).

FIG. 7(b) illustrates an example of a leakage-power waveform in the adjacent channel. Because each channel is assigned with a carrier signal whose frequency is different from the other, the power leaked from the adjacent channel has a frequency component different from that of the carrier-power of the channel in consideration. Leakage power is generated in the second, third and higher channels above and below the transmission channel. A maximum value in the adjacent channel constitutes the peak power.

FIG. 8 shows an example of conventional process for measuring leakage power. First, an average power level is measured using a power meter for each of the time periods of the burst-on period and the burst-off period. Subsequently, the average power during the burst-on period is computed by considering the duty ratio of the burst-on period with respect to the total period. The leakage power value determined by this method is an average value; therefore, the peak leakage power as shown in FIG. 7(b) cannot be determined.

In another conventional measurement method, a frequency domain test instrument, such as a spectrum analyzer is used. This method calculates the average power over the burst-on period after taking measurements in the frequency domain using a commercially available spectrum analyzer. However, measurement results obtained by using a spectrum analyzer involve a process of sampling the input signal waveform. Generally, in order to ensure that the maximum power can be definitely determined, more than one sample per frame is required. For this reason, taking the sweep time into account, 90 millisecond is required to obtain one sample if the time length of one slot is 15 millisecond and one frame comprises 6 slots. If the spectrum analyzer takes 500 samples, it will take 45 seconds for one measurement of the peak leakage power. Therefore, such a measurement method takes too long and is not effective.

Recently, the necessity has arisen to measure an instantaneous event such as an interference wave at the rise and fall of a burst wave in a TDMA transmission. However, the above-described power meter or spectrum analyzer enables only the measurement of an average value of leakage power of one frame in the adjacent channels, and cannot measure an instantaneous event such as a TDMA burst signal.

SUMMARY OF THE INVENTION

Therefore, it is an object of the present invention to provide an adjacent-channel leakage-power (ACP) measurement apparatus and method for communication devices such as a transmitter that eliminates the above shortcomings indentation of five spaces. Specifically, it is an object of the present invention to enable the measurement of a transition of leakage power in the adjacent channels of a transmitter in the time domain using a digital signal processing technique.

It is another object of the present invention to provide the definition of the adjacent channel leakage power (ACP) and the apparatus and method for carrying out the measurement of the ACP define in the present invention.

In the measuring system of the present invention for measuring the adjacent channel leakage power of communication devices such as a transmitter, the adjacent channel leakage power is defined as a ratio between a power leaked from the adjacent channels and a carrier (transmission) channel power.

In the measurement system of the present invention, a mixer that mixes the output of a local oscillator and a signal from the device to be measured is provided. An A/D converter converts the output signal of the mixer at a sampling frequency provided from an oscillator to convert the analog signal to corresponding digital data. In addition, a Hilbert converter converts the digital data into a complex signal having a real part and an imaginary part, and a low-pass filter removes unnecessary frequency components from the signal output by the Hilbert converter.

A band pass filter or other frequency separation circuit filters the low pass filter output signal to separately obtain a signal corresponding to the transmission channel and a signal corresponding to the adjacent channels in accordance with the transmission system. A power processing section computes the power levels derived from the complex numbers output from the band pass filter. The power processing section obtains the ratio of the adjacent channel power and the carrier channel power based on the real parts and imaginary parts of the respective power derived from the Hilbert converter. The above components constitute the adjacent channel leakage power measurement apparatus of the present invention.

In addition, the above measurement apparatus can additionally include a decimation section, which performs decimation, i.e., curtails the excess data of the output data from the low-pass filter to increase the measurement speed, and the output from the decimation section is fed to the band pass filter.

Another aspect of the present invention is a method of measuring the adjacent channel leakage power from a device to be measured such as a transmitter. The measuring method includes the step of mixing the output of the local oscillator with the signal from the transmitter to be measured to generate an intermediate frequency signal. The output signal generated by the mixing step is converted to a digital signal by means of the A/D converter having a sampling rate determined by an output of the sampling frequency oscillator. In the Hilbert conversion step, the digital data is converted to a complex signal by the Hilbert converter and the low-pass filter removes unnecessary frequency components from the signal of the Hilbert converter. In the signal separation step, the band pass filters filter the low pass filter output signal to separate the digital data corresponding to the transmission channel and the adjacent channels based on the frequency characteristic of the transmitter under test or the transmission system. Finally, the power processing section computes the leakage power value derived from the set of complex numbers output by the band pass filters.

Furthermore, in the above measurement method, the adjacent channel leakage power measurement method includes the step of performing the decimation process such that the output data from the low-pass filter is reduced by the decimation section and the output signal from the decimation section is fed to the band pass filters.

According to the present invention, because the frequency of the A/D converter is approximately 220 kHz, the A/D converter can readily convert analog to digital in real time. In addition, the real and imaginary components generated by the Hilbert converter can be processed in real time. Furthermore, since the decimation function is performed only as needed, it does not take excessive time for processing.

Because the characteristics of the band pass filters meet the specifications of each telecommunication system, data that has good reproducibility is obtained. In addition, the band pass filters are constructed for the carrier (transmission) channel, upper adjacent channel and lower adjacent channel, respectively. The band pass filters are formed, for example, of a digital signal processor as is known in the art. As in the foregoing, in the present invention, the ACP is defined as the ratio of the power from the adjacent channel and the carrier channel. In the power processing section, the sum of the square of the real component and the square of the imaginary component is computed to obtain the adjacent channel power. Similarly, the sum of the square of the real component and the square of the imaginary component is calculated to obtain the carrier channel power. The ratio of the sums obtained in the process noted above is the ACP according to the present invention. In this way, the processed results are obtained in real time, hence an instantaneous change observed in the burst signal and a corresponding power transition in the time domain are precisely measured.

BRIEF DESCRIPTION OF THE DRAWINGS

FIGS. 7(a) and 7(b) show an example of the waveforms of the transmission channel and adjacent channel.

FIG. 8 is an example of a conventional measurement concept for measuring the leakage power.

DETAILED DESCRIPTION OF THE INVENTION

The embodiments of the invention are described with reference to the drawings. As stated with respect to the background of the invention, in a transmitter having a plurality of transmission channels, carrier signal power of other transmission channels, especially of adjacent channels, leak to a transmission channel in question. Within the context of this invention, the carrier power of the adjacent channels leaked to the channel in question may also be referred to as "leakage power", and the channel in question may also be referred to as "carrier channel" or "transmission channel." The inventor of the present invention defines the adjacent channel leakage power (ACP) as in the following:

$$ACP(t) = \frac{I_a^2(t) + Q_a^2(t)}{\dfrac{1}{T}\int_0^T (I_c^2(t) + Q_c^2(t))dt} \quad [\text{dB}]$$

In the above equation, $I_a$ and $Q_a$ designate a real component (part) and an imaginary component (part), respectively, of the power from the adjacent channel i.e., the leakage power. $I_c$ and $Q_c$ designate a real component and an imaginary component of the power of the carrier channel in consideration. Therefore, the adjacent channel leakage power (ACP) of the present invention is a ratio of the power leaked from the adjacent channel and the power of the carrier channel in consideration. Each of the adjacent channel power and the carrier channel power is expressed as a function of time. In the above example, the carrier power is averaged with respect to the predetermined time length T.

Figure 1:
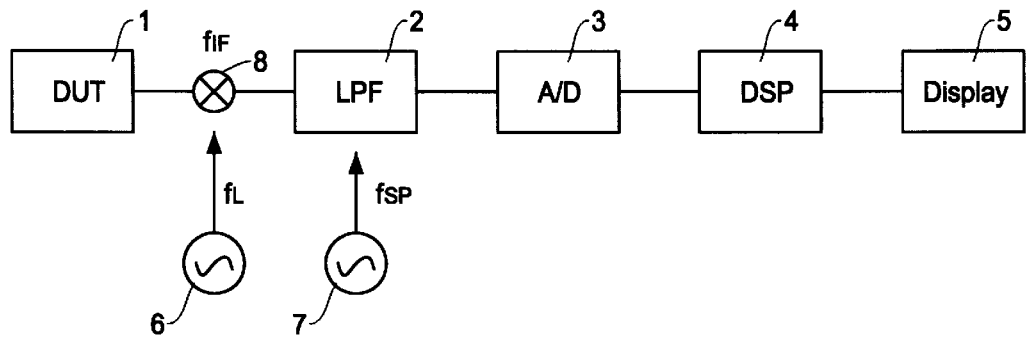
FIG. 1 is a block diagram of a first embodiment of the present invention.

FIG. 1 illustrates a block diagram of the first embodiment of the present invention. As shown in FIG. 1, a signal to be measured from a device under test (DUT) 1, such as a transmitter, and a local frequency $f_L$ from the local oscillator 8 are mixed by a frequency mixer 8. The resultant signal is produced which is in the intermediate frequencies $f_{IF}$ which are the sums and differences between the two signals mixed by the frequency mixer 8. Subsequently, the signal of interest is extracted from either the sum signal or difference signal in the intermediate frequencies $f_{IF}$ through a low-pass filter (LPF) 2.

Thereafter, analog-to-digital conversion is performed by an analog-to-digital (A/D) converter 3 at a sampling rate equal to the frequency fSp from a sampling frequency oscillator 7. The sampling frequency $f_{SP}$ will be determined based on the frequency range of the input signal applied to the A/D converter 3 according to the Nyquist's sampling theory. Hence the filtered intermediate frequency signal is converted to a digital signal.

Preferably, the selection of the intermediate frequencies $f_{IF}$ as noted above is made to select the lower frequency range (for example, around 220 kHz) so as to facilitate the analog-to-digital conversion with high accuracy and low cost. For this reason, the frequency mixer 8 can advantageously be composed of multiple stages connected in series, if necessary, to gradually decrease the frequency of the intermediate frequency signal to be analyzed.

The data digitized by the A/D converter 3 is processed as described below by a digital signal processor (DSP) 4. Ultimately, the adjacent-channel leakage power is determined and displayed in a display unit 5 as will be described in detail later.

Figure 2:
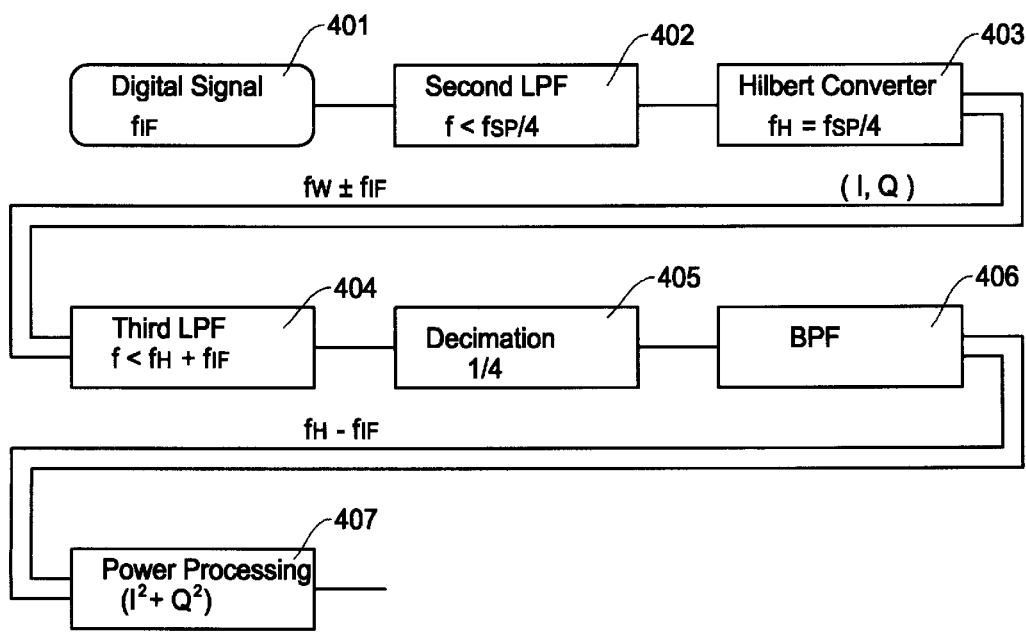
FIG. 2 is a block diagram of the digital signal processor (DSP) shown in FIG. 1 of this invention.
Figure 4A:
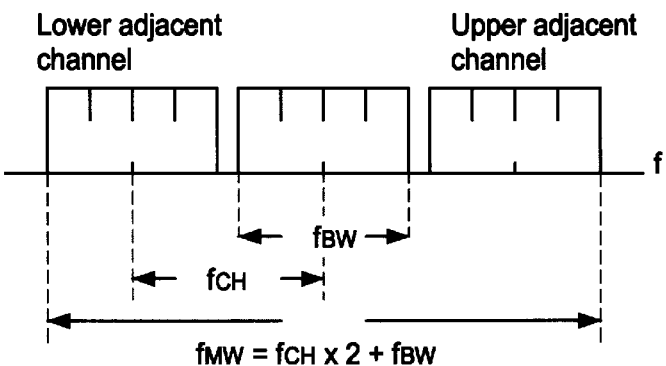
FIG. 4 illustrates steps of frequency conversion by the signal processing of the present invention.
Figure 4A:
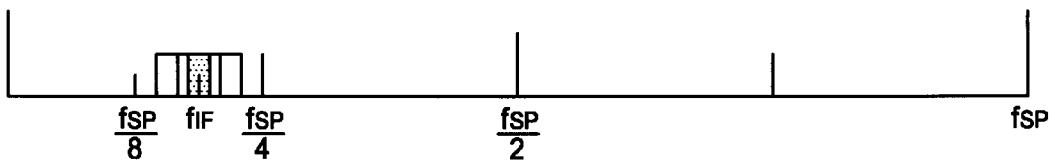
Figure 4A:
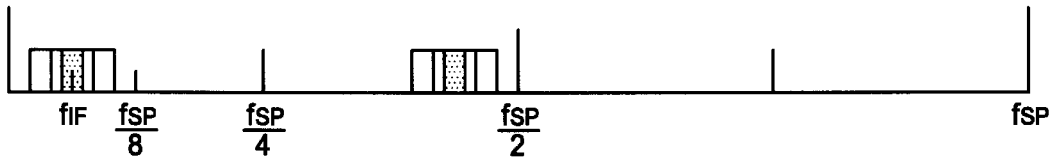
Figure 4A:
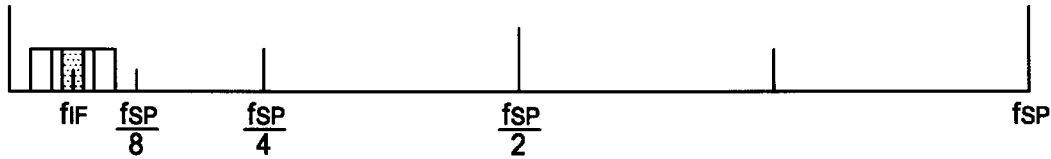
Figure 4A:
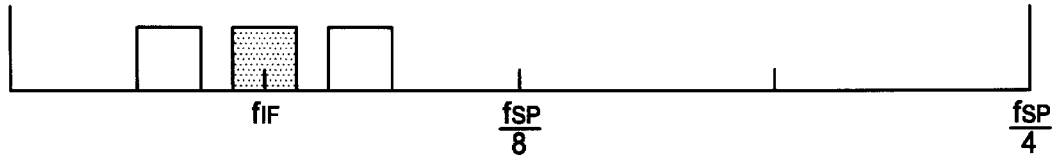

FIG. 2 is a block diagram of the DSP used in accordance with the present invention. FIG. 4 shows the steps of frequency conversion via the measuring system and measurement method used in this invention. As shown in FIG. 2, in the digital signal processor 4 (DSP), the digitized intermediate frequency signal $f_{IF}$ is provided to a second low pass filter (LPF) 402. The high frequency signal components of frequency bands which are not of interest are removed by the second LPF from the intermediate frequency signal $f_{IF}$. As shown in FIG. 4(b), the second LPF is designed to filter out high-frequency signal components higher than $f_{SP}/4$ where $f_{SP}$ is the sampling frequency as noted above.

After the filtering, the input signal is converted to a vector form of a set of complex numbers by the Hilbert converter 403. The Hilbert converter 403 outputs two signals (i.e., an I component and a Q component) corresponding to the real and imaginary components of the input signal. The I component designates a real part (in-phase component) of the input signal while the Q designates an imaginary part (quadrature component) of the input signal. From the two signals resulting from the Hilbert conversion ($f_H \pm f_{IF}$), only the signal of interest is extracted by means of a third low pass filter (LPF) 404. For example, the ($f_H + f_{IF}$) component may be filtered out by the third LPF.

Thereafter, the data may be decimated by a decimation section 405 as needed. The decimation is carried out in order to reduce the unwanted data while securing the sufficient number of samples so that necessary information contained in the data will not be lost. At the same time, the sampling rate is adjusted to the minimum so that later processing will not require high speed operation. For example, in one embodiment, ¼ of the data is excised to obtain values for calculating the leakage power.

After the number of data bits is reduced by the decimation process, the input signal is filtered through a band pass filter (BPF) 406. The band pass filter 406 has filtering characteristics consonant with the characteristics of the telecommunications equipment used for transmitting. For example, the filter 406 is designed to have filtering characteristics in accordance with various specifications such as DMCA (digital multi-channel access), and can be implemented by either analog or digital methods.

The band pass filter 406 is to separate the signal components of the adjacent channel from the signal components of the carrier channel. Because each channel is assigned with a carrier signal whose frequency is different from the other, the power leaked from the adjacent channel has a frequency component different from that of the carrier power of the channel in consideration. The band pass filter 406 can separate the leakage power (adjacent channel carrier power leaked to the transmission channel in question) from the carrier power of the transmission channel in question. Thus, the filter 406 can be constructed to filter the carrier channel and each adjacent channel, separately depending on the required bandwidth and number of samples. For example, the band pass filter is designed to pass each of the three channels including the frequency bands of the carrier channel, the upper adjacent channel and the lower adjacent channel. Such a band pass filter can be established by the digital signal processor as is well known in the art. Since the purpose of the band pass filter 406 is to separately obtain the power leaked from the adjacent channel and the carrier channel, the other circuit structure, for example, a band reject filter (notch filter) or other frequency separation means may also be used.

After the frequency separation by the band pass filtering, in a power processing 407, the sum of the squares of the real and imaginary components (i.e., $I^2+Q^2$) is determined for each of the carrier channel and the adjacent channel. The ratio of this calculated value is representative of the adjacent channel leakage power of the present invention, and corresponds to an instantaneous value of the transition in the time domain.

Figure 5:
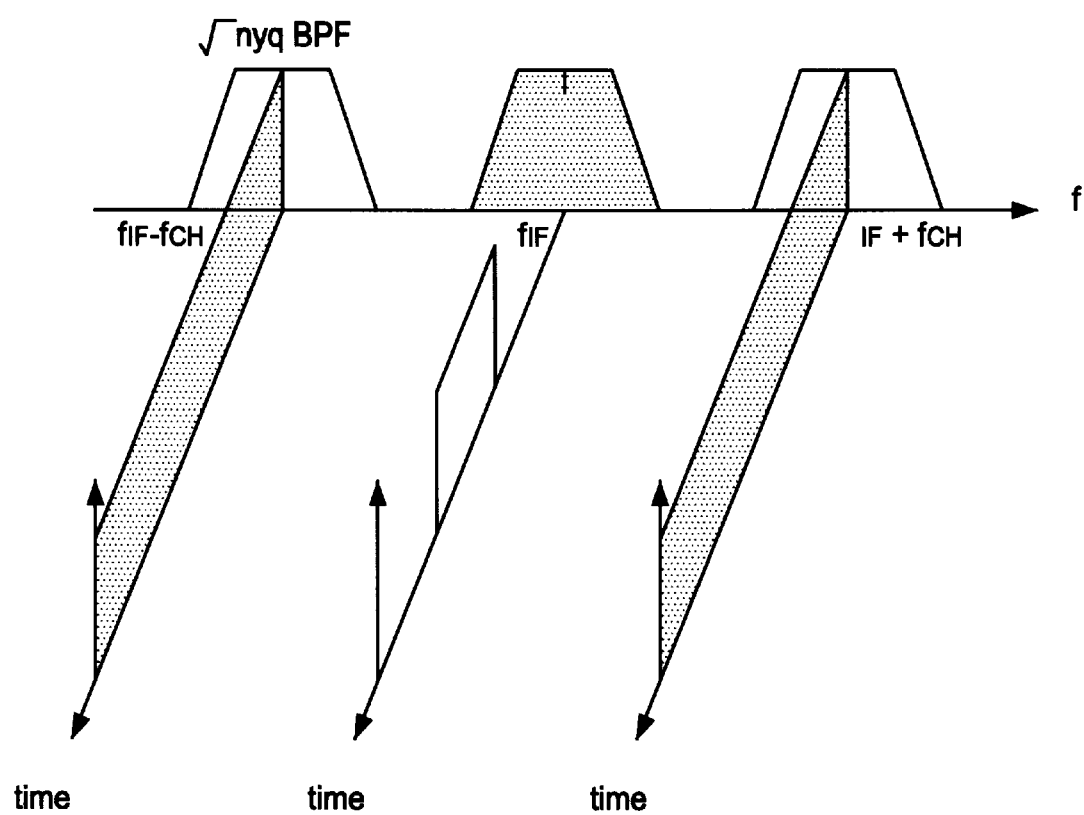
FIG. 5 shows the signal processing operation as a function of the frequency, time and power.

FIG. 5 illustrates the effects of the above described signal processing in three dimensions (i.e., frequency, time, and power). As depicted in FIG. 5, three channels are processed simultaneously, although it will be appreciated by those of ordinary skill in the art that 5 or more channels could be added as needed. In addition, the averaging process is performed on the processed results. For example, an averaged ACP within the TDMA slot, an averaged ACP within the TDMA frame, a peak ACP, and an averaged ACP of the digital modulation section, etc., can be obtained.

Figure 6A:
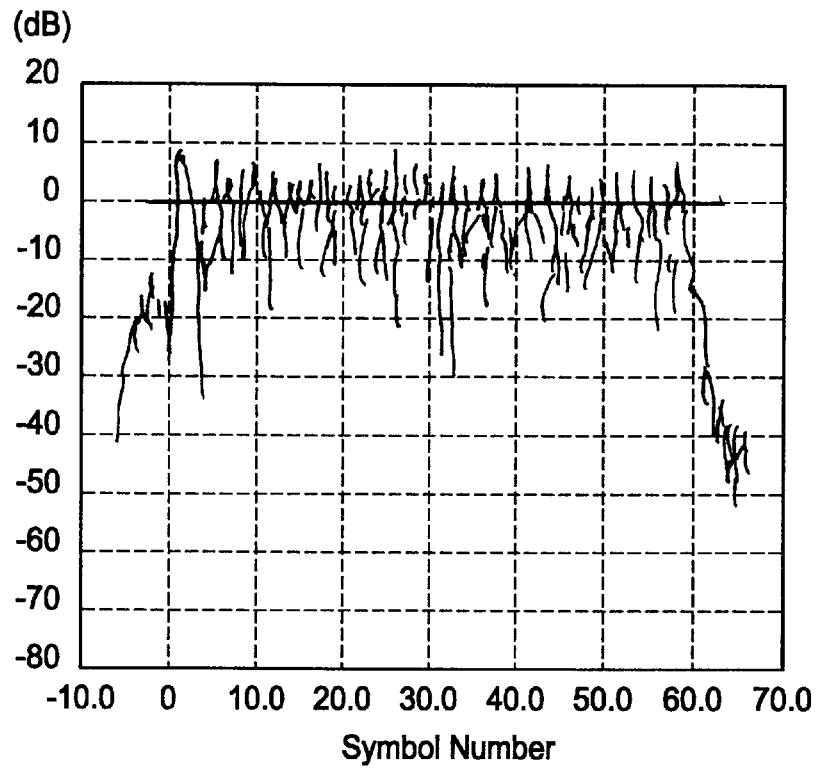
FIG. 6(a) shows an example of power of the carrier (transmission) channel.
Figure 6B:
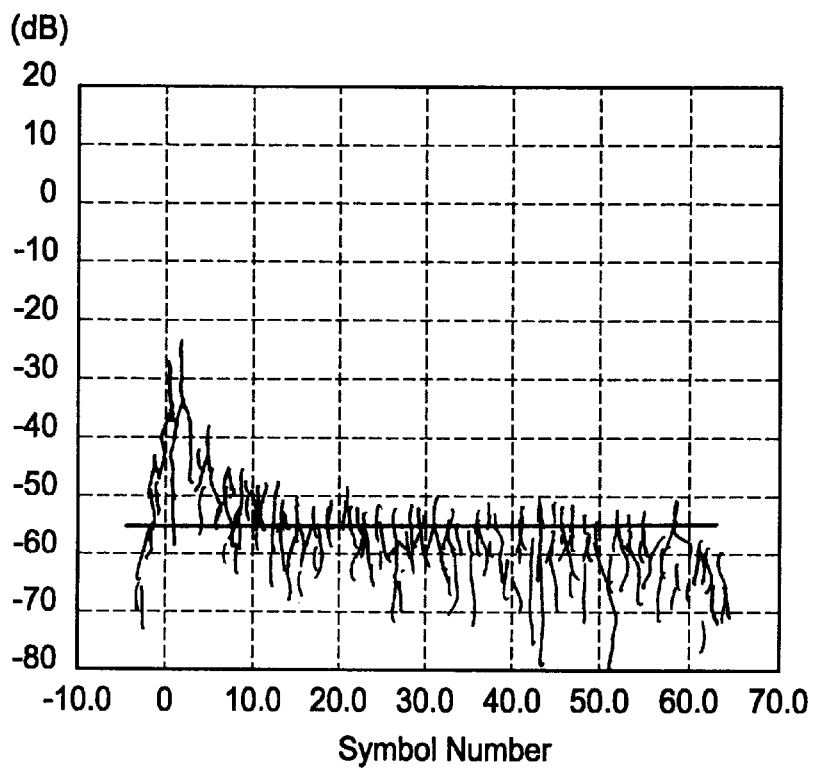
FIG. 6(b) shows an example of the power leaked from the upper adjacent channel (+25 kHz).
Figure 6C:
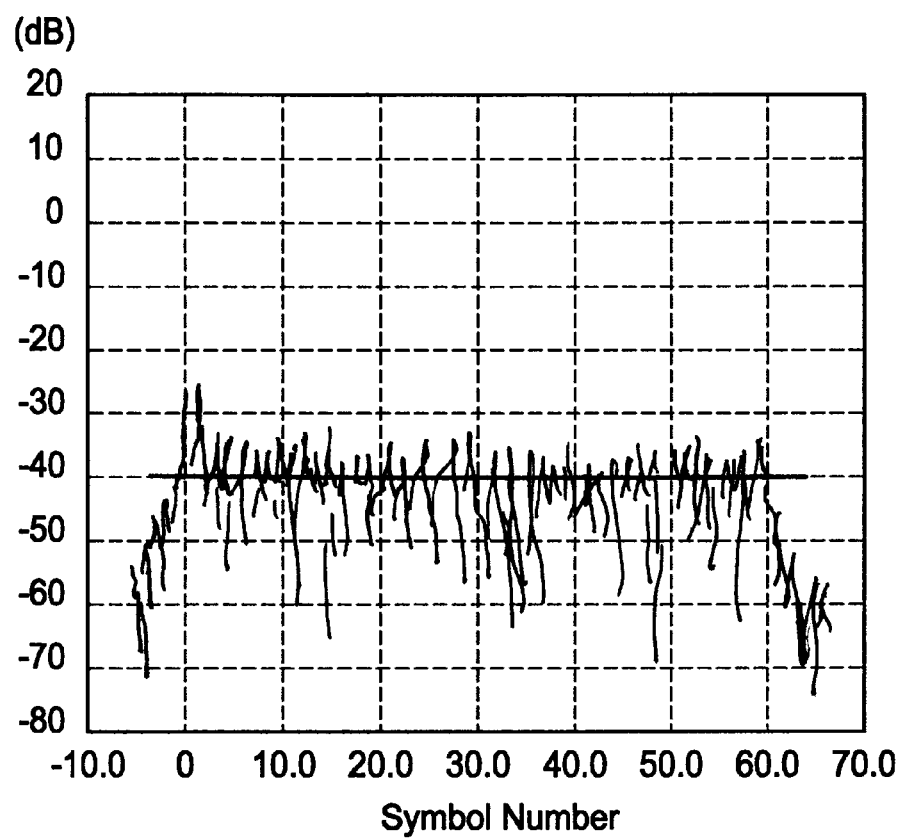
FIG. 6(c) shows an example of the power leaked from the lower adjacent channel (−25 kHz).

The processed results of the DSP 4 are displayed on the display unit 5. FIG. 6 shows a display of adjacent-channel leakage power. FIG. 6(a) depicts the carrier channel, FIG. 6(b) depicts the upper adjacent channel (+25 kHz), and FIG. 6(c) depicts the lower adjacent channel (−25 kHz).

Note that in the description of the block diagram of the first embodiment of the invention, only the primary ACP was measured. However, in order to measure the second, third and higher orders, further embodiments of the present invention can be constructed such that the center frequency of the local oscillator frequency $f_L$ is offset properly and the signal processing is performed several times to determine the leakage power in the other bands of interest. In addition, with respect to the filtering characteristics of the BPF 406, if the filtering characteristics of the BPF 406 are modifies in accordance with requirements defined in the standers of the telecommunications systems the ACP for each system can be measured accurately. Furthermore, the present invention could be designed such that the signal observations are made by performing the ACP measurement and modulation analysis with the same data and time synchronizing the measurement results and demodulated data.

Thus far the apparatus for an adjacent-channel leakage-power measurement system has been described; however, it will be appreciated that, under another aspect, an embodiment of the invention comprises a method for measuring adjacent-channel leakage power by performing a series of steps.

Figure 3:
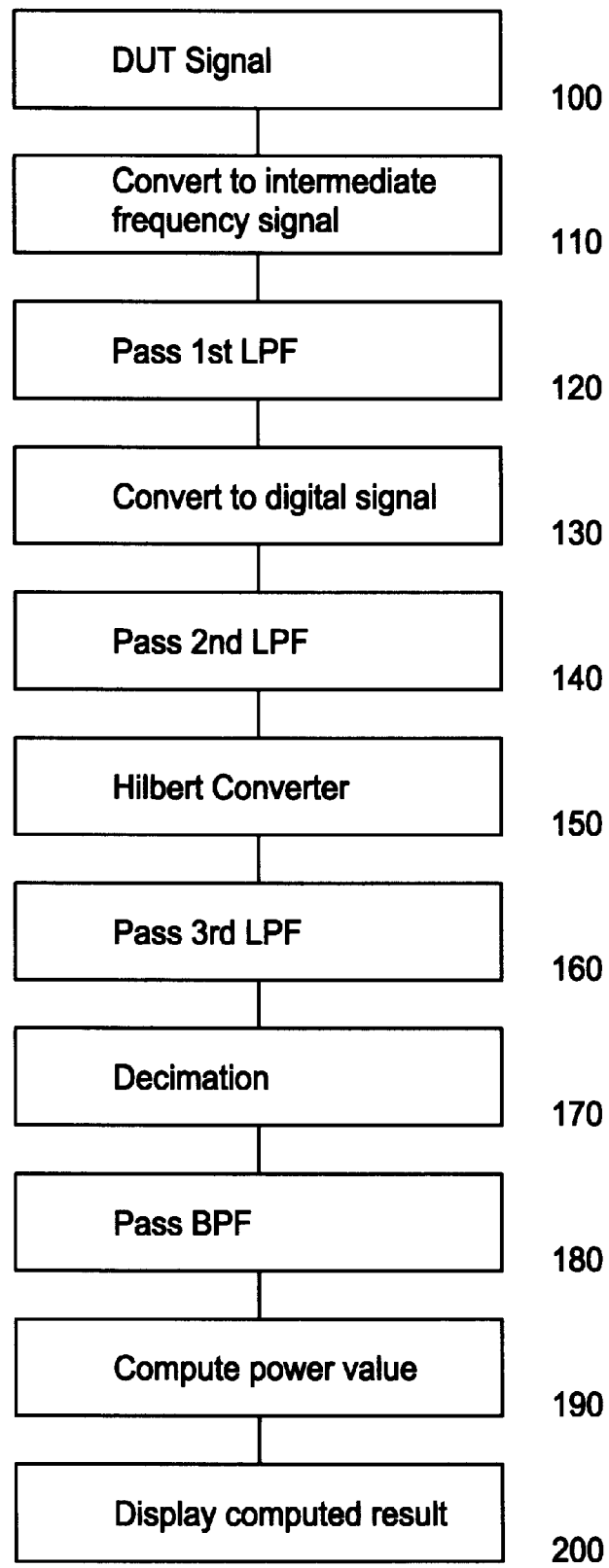
FIG. 3 is a flow chart showing the details of the method of measuring the peak leakage power in accordance with the present invention.

FIG. 3 is a flow chart which details the measurement procedure. Mixing the output of the local oscillator and the signal from the measured object generates an intermediate frequency signal (step 110 of FIG. 3). The output signal generated by the mixer is converted to a digital signal by means of the A/D converter having a sampling rate determined by an output of the sampling frequency oscillator (step 130). Subsequently, the digital data is converted to a complex signal by the Hilbert converter (step 150) and the low-pass filter removes unnecessary frequency components from the signal output by the Hilbert converter (step 160). The band pass filter filters the low-pass filter output signal to produce a signal having a frequency characteristic in accordance with the transmission system (step 180). Finally, the power processing section computes the leakage power derived from a set of complex numbers output by the band pass filter (step 190).

Furthermore, in the above measurement method, the adjacent channel leakage power measurement method can be arranged such that the output data from the low pass filter is decimated (step 170) by the decimation section and the output signal from the decimation section is fed to the band pass filter (step 180).

In accordance with the above description of the invention, an adjacent channel leakage power measurement apparatus and method are provided which enable the measurement of an ACP transition in the adjacent channels of a transmitter in the time domain.

In the foregoing, the ACP is defined as a ratio of the leakage power from adjacent channel and the carrier power of the transmission channel. Another definition of the adjacent channel leakage power may be designated as an absolute power level derived from the adjacent channel, i.e., the absolute value of $I_a^2(t)+Q_a^2(t)$. This measurement can be made by using the ratio of adjacent channel power and the carrier power of the present invention as describe above while measuring the absolute value of the carrier channel by a spectrum analyzer or a power meter.

Although the preferred embodiments of the invention have been described in detail above, it will be appreciated by one of ordinary skill in the art that various obvious modifications could be made to the apparatus and method of the present invention without departing from its spirit or essence. Accordingly, the above description should be construed as illustrative and not restrictive; and the scope of the invention is defined by the appended claims.

What is claimed is:

1. A power measurement apparatus for measuring a ratio of power leaked from an adjacent channel to carrier power of a particular transmission channel of a communication device having a plurality of transmission channels wherein carrier power of the adjacent channel leaks to the particular transmission channel, said power measurement apparatus comprising:

a frequency mixer which mixes an output of a local oscillator with a signal from the particular transmission channel of the communication device under test, said signal including the carrier power of the particular transmission channel and the carrier power of the adjacent channel leaked to the particular transmission channel ("leakage power") wherein frequencies of the carrier power of the particular transmission channel and the leakage power are different from one another;

an A/D converter which converts an output signal of said frequency mixer to a digital signal using a predetermined sampling frequency;

a Hilbert converter which converts said digital data into a complex signal;

a low pass filter which removes unnecessary frequency components from said complex signal from said Hilbert converter;

a frequency separation means for separating signals from said low pass filter into a signal corresponding to the leakage power from the adjacent channel and a signal corresponding to the carrier power of said particular transmission channel of said communication device under test; and a power processing unit which receives the signal corresponding to the carrier power of the particular transmission channel and the signal corresponding to the leakage power from the adjacent channel and calculates a ratio of said leakage power from said adjacent channel to said carrier power of said particular transmission channel of said communication device under test.

2. The power measurement apparatus of claim 1, wherein said frequency separation means is a bandpass filter which can separately pass each of the signal corresponding to the leakage power from the adjacent channel and the signal corresponding to the carrier power of the particular transmission channel.

3. The power measurement apparatus of claim 1, wherein said complex signal from said low pass filter is decimated to a fixed amount by a decimation unit and the output signal from said decimation unit is fed into said frequency separation means.

4. A power measurement method for measuring a ratio of power leaked from an adjacent channel to carrier power of a particular transmission channel of a communication device having a plurality of transmission channels wherein carrier power of the adjacent channel leaks to the particular transmission channel, said power measurement method comprising the following steps of:

mixing an output of a local oscillator with a signal from the particular transmission channel of a communication device under test for producing an intermediate frequency signal, said signal including the carrier power of the particular transmission channel and the carrier power of the adjacent channel leaked to the particular transmission channel ("leakage power") wherein frequencies of the carrier power of the particular transmission channel and the leakage power are different from one another;

converting said intermediate frequency signal to a digital signal by an A/D converter with a predetermined sampling frequency;

converting said digital data to a complex signal by a Hilbert converter;

removing unnecessary frequency components from a said complex signal of said Hilbert converter using a low pass filter;

separating a signal from said low pass filter to a frequency of the leakage power from the adjacent channel and a frequency of the carrier power of the particular transmission channel of said communication device under test; and computing a ratio of said leakage power from said adjacent channel to said carrier power of said particular transmission channel of said communication device under test.

5. The power measurement method of claim 4, wherein decimation is performed on an output of said low pass filter output by a decimation unit, and the output signal from said decimation unit is used in said separating step.

* * * * *